Jan. 25, 1955 L. I. WEISSMAN Re. 23,931

WINDOW ASSEMBLY AND SASH HOLDER

Original Filed Aug. 4, 1950 3 Sheets-Sheet 1

INVENTOR.
LORANT I. WEISSMAN
BY
Oedham & Oedham
ATTORNEYS

WINDOW ASSEMBLY AND SASH HOLDER
Original Filed Aug. 4, 1950 3 Sheets-Sheet 2
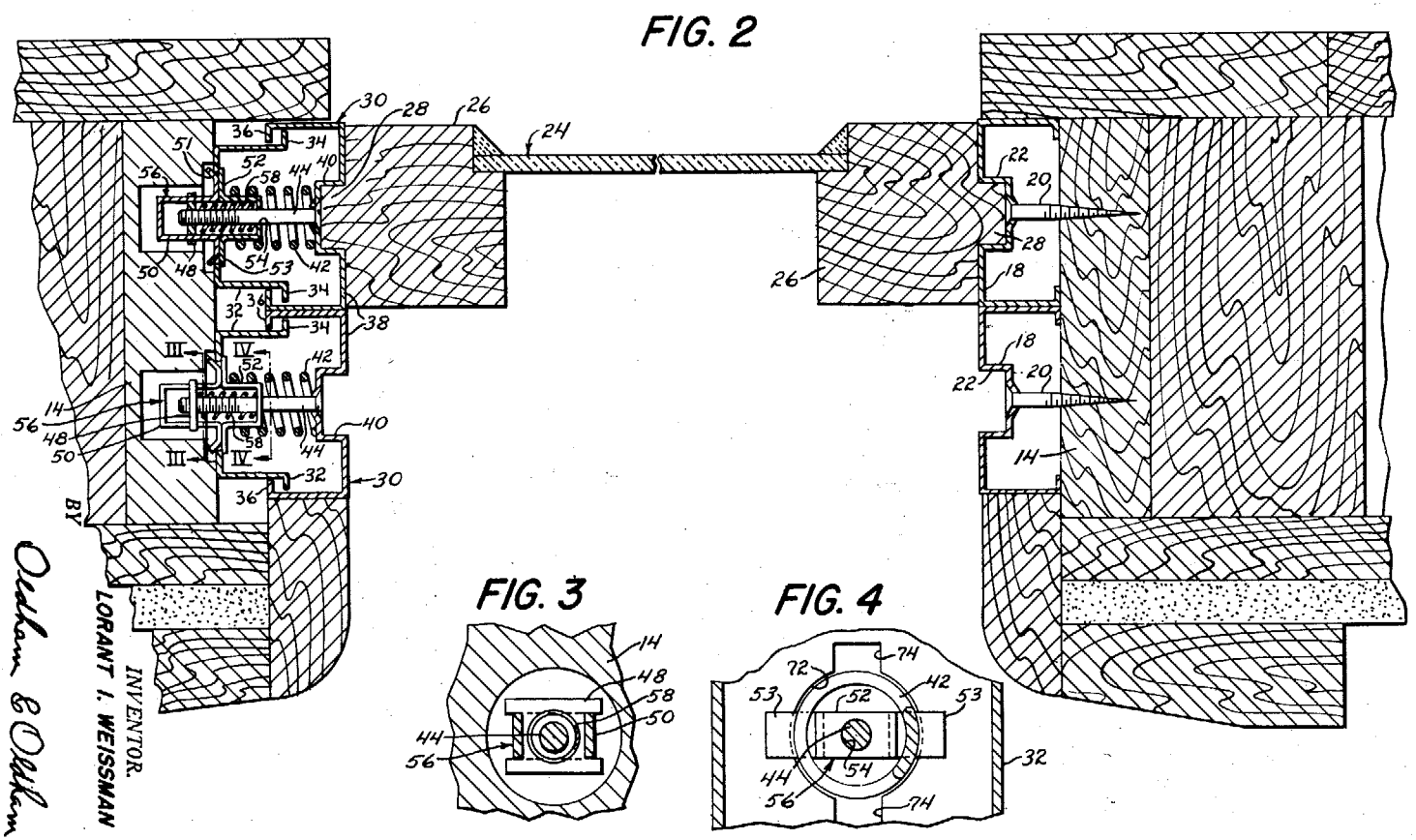
INVENTOR.
LORANT I. WEISSMAN
BY
Oldham & Oldham
ATTORNEYS

WINDOW ASSEMBLY AND SASH HOLDER

Original Filed Aug. 4, 1950 3 Sheets-Sheet 3

INVENTOR.
LORANT I. WEISSMAN
BY
Oldham & Oldham
ATTORNEYS

United States Patent Office

Re. 23,931

Reissued Jan. 25, 1955

23,931

WINDOW ASSEMBLY AND SASH HOLDER

Lorant I. Weissman, Los Angeles, Calif., assignor to Forest City Material Co., a corporation of Ohio Original No. 2,631,336, dated March 17, 1953, Serial No. 177,727, August 4, 1950. Application for reissue August 10, 1954, Serial No. 449,032

6 Claims. (Cl. 20—12)

Matter enclosed in heavy brackets [ ] appears in the original patent but forms no part of this reissue specification; matter printed in italics indicates the additions made by reissue.

This invention relates to windows for houses, buildings and the like and, more particularly, is concerned with a window sash holder which will support a window sash in any vertical position without the use of counterweights.

It has been proposed heretofore to provide windows with resiliently positioned sash supporting channels which eliminate counterweights, but known structures are open to the objection that the spring tension on the sash guiding channels is often not in the proper amount, so that the window will either be so tightly held that it cannot be moved, or so loosely held that it will not stay in raised position. Again, known structures of the indicated type are relatively costly and difficult to install and offer problems and complications with respect to locking of the sash against removal from the guide channels.

It is the general object of my invention to avoid and overcome the foregoing and other difficulties of and objections to known windows of the indicated type by providing an improved, weather proof, readily installed, inexpensive, and efficient window sash-holder assembly which will provide for non-sticking vertical movement of the sash without the use of counterweights and yet will firmly hold the sash at any desired raised position.

Another object of my invention is the provision of a simple window sash-holder which will permit easy removal of the window sash from the frame from either the inside or outside of a building, for example, to facilitate cleaning of the window panes.

Another object of my invention is to provide an inexpensive positive locking unit to prevent removal of the sash from the window.

The aforesaid objects of my invention, and other objects which will become apparent as the description proceeds, are achieved by providing a complete window assembly including a main frame, a pair of fixed guide members secured to one side jamb of the frame, and a pair of yieldable guide members on the opposing side jamb of the frame. A pair of conventional window sash members are disposed between said yieldable and fixed guide members and are thereby frictionally supported in the frame in any desired vertical position. Tongues on the side of each sash slide in corresponding grooves formed in said guide members. Resilient adjustable pressure means, to be described in detail hereinafter, are provided to permit the frictional pressure between the guide members and the sash to be varied. The sash is adapted to be removed by forcing the sash against the yieldable guide member. This will cause the entire sash to move laterally so that the tongue on the opposite side of the sash from the yieldable guide may be removed from the groove in the stationary guide member. The whole sash can then be swung in or out and withdrawn from the window frame. A lock mechanism is provided to prevent depression of the yieldable guide member and removal of the sash.

For a better understanding of my invention, reference should be had to the accompanying drawings, wherein Fig. 1 is a front elevational view of one form of the window frame and improved sash holder of my invention;

Fig. 2 is an enlarged horizontal transverse fragmentary cross-sectional view taken substantially along line II—II of Fig. 1 and illustrating details of the guide members;

Fig. 3 is an enlarged fragmentary sectional view taken substantially on line III—III of Fig. 2, and showing the features of the construction of the resilient guide member support;

Figure 1:
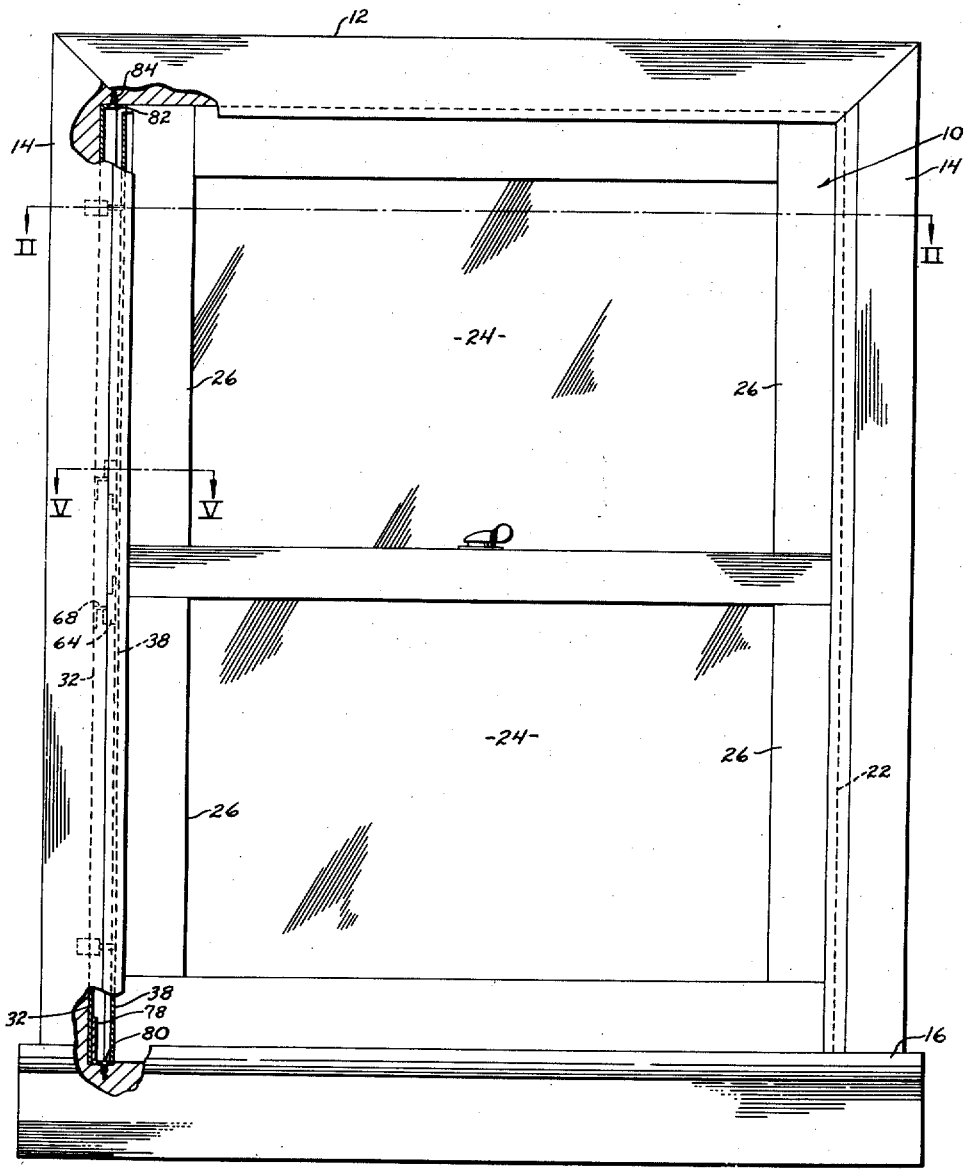
Figure 5:
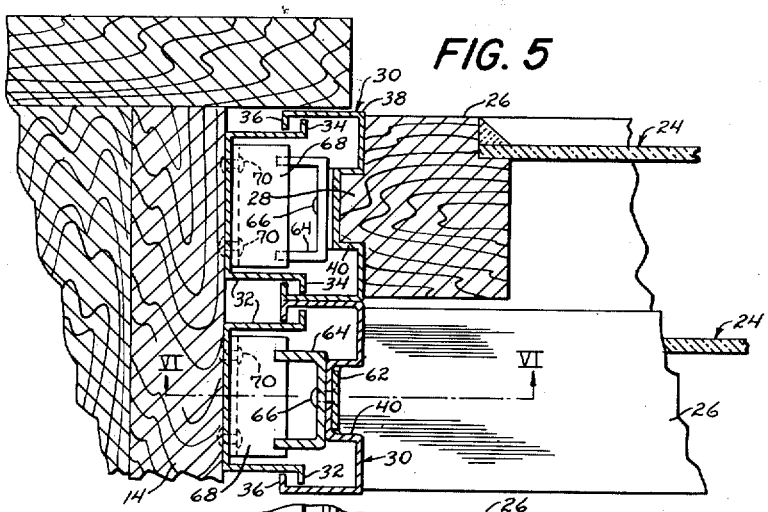
Figure 6:
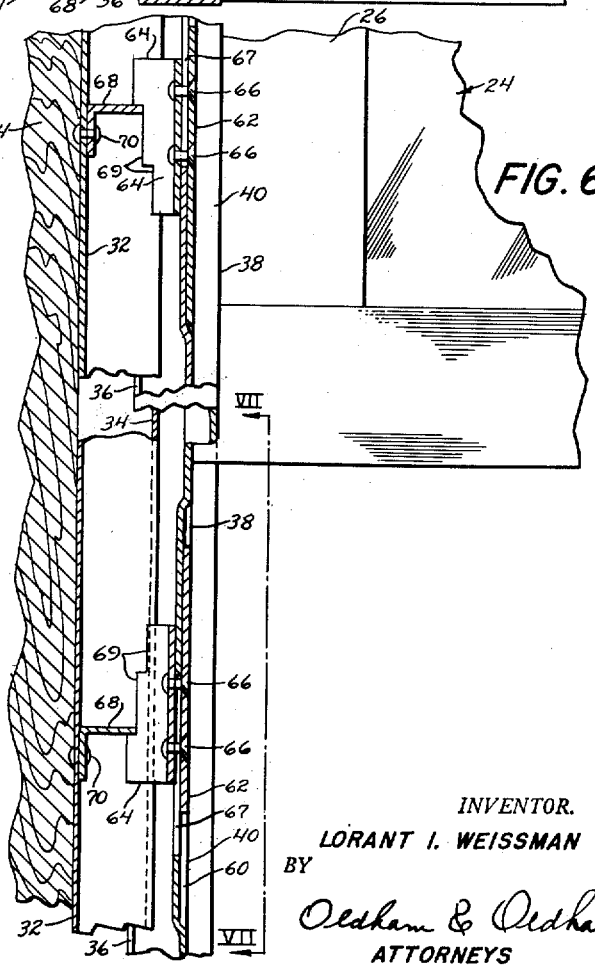
Figure 7:
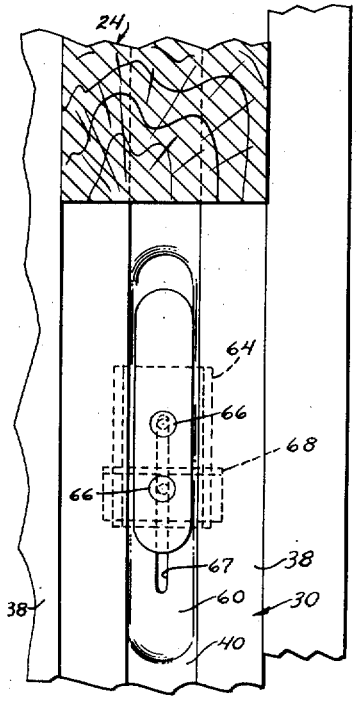

Fig. 4, illustrating further details of the guide support, is an enlarged fragmentary view taken substantially on line IV—IV of Fig. 2;

Fig. 5 is an enlarged fragmentary sectional view taken on the line V—V of Fig. 1 and shows features of the lock;

Fig. 6, concerned with additional details of the lock, is an enlarged fragmentary view taken substantially along the line VI—VI of Fig. 5; and Fig. 7, still relating to the lock, is an enlarged fragmentary sectional view taken on the line VII—VII in Fig. 6.

With specific reference to the form of the invention illustrated in the drawings, the numeral 10 indicates generally a complete window frame and sash assembly. The window frame is of the conventional type including a head or transverse top board 12, vertical boards or side jambs 14, and a bottom sill 16. At one side of the frame 10, a pair of stationary channel-shaped guide members 18 are secured in side-by-side relation to the side jambs as by screws 20. Grooves 22 are provided running the length of the transverse face of the channels 20. These grooves serve as guides for the vertical movement of one vertical edge of the upper and lower window sash, indicated generally at 24. The window sash is of the conventional type including a frame 26 having tongues 28 along its vertical sides. These tongues engage the grooves 22 to hold the sash in position and yet permit vertical movement of the sash in the window frame.

Yieldable guide members are provided on the opposite sides of each sash from guide members 18 and are indicated generally at 30. Each guide member 30 is assembled as a unit before being secured in place in the window frame. Each yieldable guide member assembly includes a stationary channel member 32 which rests against the side jamb 14 of the window when the assembly is in position. Formed on the outer edges of this channel are lips 34 which engage inwardly turned lips 36 formed on channel member 38. Thus, when channel member 32 is slid within the channel member 38, the two are interlocked as shown in Fig. 2. Each channel member 38 is provided with a longitudinal groove 40 which serves as a guide for the tongue 28 on the vertical edge of the sash frame 26.

The channel member 38 is resiliently urged away from the channel member 32 and into frictional engagement with the edge of the sash 26 by means of a plurality of compression springs 42 which are provided at spaced points between the channel members, for example near the top and bottom ends thereof. When the sash 26 is removed, as for cleaning, flanges 34 and 36 are urged by the springs into engagement, the flanges acting as stops to restrict the relative movement of the channels apart.

An important feature of my invention is to vary the frictional, resilient pressure exerted by channel 38 against the edge of sash 26. Details of this arrangement can best be understood by reference to Figures 2, 3, and 4 of the drawings. Associated with each spring 42 is a flat-head screw 44 which extends through a countersunk hole in the bottom of the groove 40 of channel 38. This screw passes through the center of the compression spring 42 and into threaded engagement with an H-shaped nut shown at 48. This nut 48 is guided for sliding but non-rotative movement on a yoke or U-shaped bracket 50 which is spot-welded or otherwise secured to a similar but shorted bracket 52. A hole 54 is provided in the end of the bracket 52 to permit the screw 44 to pass freely through it.

A smaller compression spring 58 surrounds screw 44 between the nut 48 and the bottom of bracket 52. This spring 58 performs two special functions. First, the spring 58 urges nut 48 in a direction to keep the flat head of the screw 44 flush with the bottom of the groove 40 at all times. Thus, regardless of the resiliently floating movement of the channel member 38 against compression spring 42 as the sash is raised and lowered, compression spring 58 will at all times insure that the head of screw 44 will not project out into groove 40 so as to intersect or stop the movement of sash 26. Second, the reaction of spring 58 urges channel 38 in opposition to spring 42. Thus, it will be appreciated that the net frictional pressure exerted by channel 38 against the edge of the sash 26 is the difference between the pressure exerted by spring 42 and that exerted by spring 58. By tightening the screw 44, spring 58 will be compressed by the relative movement of the nut 48, so that the frictional pressure exerted by channel 38 will be reduced. Turning the screw 44 in the opposite direction will reduce the compression of the spring 58 thus increasing the net frictional pressure exerted by the channel 38 against the sash 26.

To remove the sash 26, as for example to facilitate cleaning thereof, it is merely necessary to urge the sash laterally against the pressure of spring 42 until the tongue 28 along the opposite edge of the sash moves free of groove 22.

When the window is closed, it is desirable that each sash cannot be removed in the manner last described. To prevent such removal, the lock construction shown in Figures 6 and 7 is employed in conjunction with each pair of mating channels 32—38. A recess or depression 60 is formed in the bottom of groove 40 as shown in Fig. 6. Positioned for movement in this recess is a plate 62 of a length about three-quarters of that of the recess. A channel bracket 64 is secured to plate 62 as by rivets 66 passing through slot 67 in the bottom of the recess 60. The plate 62, lying flush in the groove 40, can be moved manually within the limits of the slot 67 and recess 60, as shown by the drawings.

Adapted to cooperate with the sliding channel bracket 64 is a fixed stop 68 which is secured by a rivet 70 or other suitable fastening means to the inner face of the channel 32. The projecting edge of the stop 68 engages the projecting edges of channel bracket 64 when the plate 62 is moved to the "locked" position indicated in Fig. 6. This prevents movement of channel member 38 laterally against the spring or springs 42. When plate 62 is moved to the other extreme or "open" position opposite to that indicated in Fig. 6, bracket 64 is moved completely out of contact with stop 68, thus permitting relative movement of channel 38 towards channel 32. A series of steps 69 of greater depth (see Fig. 6) are provided along the projecting edges of channel bracket 64 to permit locking of the movable channel 38 regardless of its relative position to channel 32 as may be produced by small variations in the over-all width of sash 26 or other dimensional variations from window to window. The lock assembly described is located near the center of the window frame, preferably in such a position that it will be covered by the sash frames when the sash frames are in their respective closed positions.

Each yieldable guide assembly 30 is first assembled before being mounted in the window frame itself. In this assembly operation, channels 32 and 38 are first interlockingly engaged by sliding one over the other. Springs 42 are then placed in position through a hole 72 (see Fig. 4) in the channel 32. The hole 72 is just of sufficient diameter to admit the spring.

Brackets 50 and 52 are provided with flanges 51 and 53 respectively, which are spot welded or otherwise secured to form a bracket assembly 56. After the spring 42 is in position as described, the bracket assembly is placed in position by putting bracket 52 within the coils of spring 42 and inserting the flanges 51 and 53, which are of such size as to exceed the diameter of the hole 72, through the notches 74 (see Fig. 4) provided on diametrically opposite sides of hole 72. The bracket assembly 56 is then twisted through approximately ninety degrees to secure it in position. To further secure the bracket assembly 56 against movement perpendicular to the channel 32, the flange 51 is turned back, so that flanges 51 and 53 engage the edge of the hole 72 on opposite faces of the bottom of channel 32.

The spring 58 and the nut 48 are then placed in position as shown by the figure, and screw 44 inserted and threaded into nut 48 until the desired frictional pressure exerted by the guide member 38 against the edge of the sash 26 is attained.

Each yieldable guide assembly 30 is held in position in the window frame at the lower end by means of an angle bracket 78 secured to the sill by means of screw 80. Channel 32 is slipped down behind the space between the side jamb and the angle bracket 78. The upper end of the channel 32 is shaped with a right angle flange 82. Screw 84 secures the flange 82 of channel member 32 at the upper end of the window frame. After the yieldable guide assembly 30 is in position, the window sash can be inserted by first engaging it in the groove provided in channel 38, and then pushing laterally on the sash to compress springs 42 to the point where the tongue 28 on the opposite edge of the sash frame can be swung into position where it will engage groove 22 in channel 18. After the sash is moved into position, the lock is engaged by sliding plate 62 into position, preventing removal of the sash member. The frictional pressure of the movable guide assembly 30 is adjusted by means of screws 44 until the resilient pressure is proper to support the sash 26 in any desired vertical position without undue resistance to movement of the sash and, equally, without the sash slipping closed.

It will be recognized that the objects of my invention have been achieved by providing sash supporting means that are inexpensive in construction, which are readily installed and operated, and are weatherproof and long-lived, and yet which offer a wide range of adjustability. By the use of controlled frictional pressure, the use of counterweights has been eliminated. The sash can be easily removed from either side of the window frame by releasing a simple locking device and removing the sash from its guides. The features of my invention may obviously be incorporated with new or used window assemblies.

While in accordance with patent statutes, one best known embodiment of my invention has been illustrated and described in detail, it is to be particularly understood that the invention is not limited thereto or thereby, but that the inventive scope is defined in the appended claims.

I claim:

1. A guide assembly for exerting adjustable lateral pressure along the edge of a window sash, said guide assembly including a fixed channel member, an interlocking guide member, said guide member engaging the edge of the sash, spring means between said interlocking members for urging the guide member laterally inwardly into engagement with the edge of the sash, screw means carried by the guide member, nut means engaged by the screw means, and adjustable resilient means between the nut means and the fixed member to urge the guide member laterally outwardly, said resilient means opposing the action of said spring means for adjusting the net frictional pressure exerted by the guide member against the sash.

2. A guide assembly for exerting adjustable lateral pressure along the edge of a window sash, said guide assembly including a fixed member, a guide member, said guide member engaging the edge of the sash, spring means between said members for urging the guide member into engagement with the edge of the sash, screw means carried by the guide member, nut means engaged by the screw means, and adjustable resilient means between the nut means and the fixed member, said resilient means opposing the action of said spring means for adjusting the net frictional pressure exerted by the guide member against the sash.

3. A guide assembly for exerting adjustable lateral pressure along the edge of a window sash, said guide assembly including a fixed member, a guide member, said guide member engaging the edge of the sash, spring means between said members for urging the guide member into engagement with the edge of the sash, resilient means engaging the fixed member, and adjusting means carried by the guide member and exposed on an outer surface thereof and engaging said resilient means, said resilient means opposing the action of said spring means and urging the guide member laterally outwardly with relation to the window sash for adjusting the net frictional pressure exerted by the guide member against the sash.

*4. A weather tight guide assembly for double hung windows capable of exerting adjustable lateral pressure along the edge of the window sash set in a window frame in which the guide assembly is mounted, said guide assembly including a pair of fixed channel members of the same height as, and whose bases rest on the side jambs of the window frame, a pair of guide channel members of the same height having bases engaging the complete edge of the sash in interlocked assemblage, the legs of each guide channel being positioned outside of the legs of its matching fixed channel and in contact throughout their heights with other vertical members of the com-*

*plete assembly so that together the guide channels substantially fill up the exterior of the side jamb opening in the window frame, and each guide channel leg provides a weather resistant barrier between the outside and the inside of the window, spring means between each fixed and guide channel urging each guide channel into engagement with the edge of the sash, and adjusting means carried by each guide channel and exposed on an outer surface thereof to adjust the spring pressure exerted by each guide channel against the sash.*

*5. In a window assembly, the combination of a window frame having two vertical side jambs, a head member, and a sill, and a pair of window sash slidably mounted between said side jambs, of guide members for each of said sash of the same height as the side jambs, one pair of said guide members being fixedly mounted on one of said side jambs for interlocked assembly with the sash, and the other pair of said guide members including a pair of fixed channel members whose bases rest on the other of said side jambs, a pair of guide channel members having bases engaging the complete edge of the sash in a tongue and groove assemblage, the legs of each guide channel being positioned outside of the legs of its matching fixed channel and in contact throughout their heights with other vertical members of the complete assembly so that together the guide channels substantially fill up the exterior of the side jamb opening in the window frame, and each guide channel leg provides a weather resistant barrier between the outside and the inside of the window, spring means between each fixed and guide channel for urging said guide channel into engagement with the edge of the sash, and adjusting means carried by each guide channel and exposed on an outer surface thereof to adjust the spring pressure exerted by each guide channel against the sash.*

*6. The device of claim 4, in which the legs of the respective channels end in lips which engage each other to limit the movement of the channels with respect to each other.*

References Cited in the file of this patent or the original patent

UNITED STATES PATENTS

| | | |
|---|---|---|
| 712,761 | Bricker | Nov. 4, 1902 |
| 832,150 | McMahon | Oct. 2, 1906 |
| 848,961 | Bricker | Apr. 2, 1907 |
| 1,727,993 | Klein | Sept. 10, 1929 |
| 1,800,104 | Pullara | Apr. 7, 1931 |
| 1,864,066 | Howenstein | June 21, 1932 |
| 2,115,139 | De Nicolais | Apr. 26, 1938 |
| 2,183,105 | Reiser | Dec. 21, 1939 |
| 2,264,020 | Dautrick et al. | Nov. 25, 1941 |
| 2,288,558 | Vose | June 30, 1942 |
| 2,303,129 | Kurtz | Nov. 24, 1942 |